(12) United States Patent
Gale et al.

(10) Patent No.: US 8,525,470 B2
(45) Date of Patent: Sep. 3, 2013

(54) USING A CIRCUIT RATING TO ESTABLISH A CHARGE RATE FOR AN ELECTRIC STORAGE BATTERY OF AN ELECTRIC VEHICLE

(75) Inventors: Allan R. Gale, Livonia, MI (US); Michael Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1775 days.

(21) Appl. No.: 11/717,312

(22) Filed: Mar. 13, 2007

(65) Prior Publication Data
US 2008/0231230 A1     Sep. 25, 2008

(51) Int. Cl.
*H02J 7/14*     (2006.01)
*G01R 31/36*     (2006.01)
*H01F 38/10*     (2006.01)

(52) U.S. Cl.
USPC ........... 320/104; 320/122; 320/125; 320/160; 324/426; 307/149

(58) Field of Classification Search
USPC .................. 320/104, 122, 125, 160
See application file for complete search history.

(56) References Cited

U.S. PATENT DOCUMENTS

| | | | |
|---|---|---|---|
| 5,598,084 A | 1/1997 | Keith | |
| 5,952,813 A | 9/1999 | Ochiai | |
| 6,087,802 A | 7/2000 | James | |
| 6,963,186 B2 | 11/2005 | Hobbs | |
| 2004/0169489 A1* | 9/2004 | Hobbs | 320/104 |
| 2005/0212521 A1* | 9/2005 | Bertness | 324/426 |
| 2006/0132085 A1 | 6/2006 | Loubeyre | |

* cited by examiner

*Primary Examiner* — Yalkew Fantu
(74) *Attorney, Agent, or Firm* — David B. Kelley; MacMillan, Sobanski & Todd, LLC

(57) ABSTRACT

A method for charging an electric storage battery in a plug-in electric vehicle through a power supply circuit includes coupling a charger to the circuit, providing the charger with a signal representing a current capacity of the circuit, using the signal to determine a maximum charge rate corresponds to the current capacity of the circuit represented by the signal, and charging the battery through the circuit and charger at the maximum charge rate.

13 Claims, 2 Drawing Sheets

USING A CIRCUIT RATING TO ESTABLISH A CHARGE RATE FOR AN ELECTRIC STORAGE BATTERY OF AN ELECTRIC VEHICLE

BACKGROUND OF THE INVENTION

1. Field of the Invention

This invention relates generally to recharging an electric storage battery using a charger and a wall outlet. More particularly, the invention pertains to detecting the current rating of a circuit that supplies power to the charger and battery.

2. Description of the Prior Art

A hybrid vehicle is a vehicle that uses two distinct power sources, such as an on-board rechargeable energy storage system and a fueled power source for vehicle propulsion. The term hybrid vehicle most commonly refers to hybrid-electric vehicle (HEV), which use internal combustion engines and electric batteries to power electric motors. Generally, kinetic energy of the vehicle is recovered during braking, converted to electric energy and stored in one of the batteries.

A plug-in hybrid electric vehicle (PHEV) is a hybrid, which has additional battery capacity and the ability to be recharged from an external electrical outlet supplied by a public utility power grid. The vehicle can be used for short trips of moderate speed without needing the internal combustion engine (ICE) component of the vehicle's power train, thereby saving fuel costs. In this mode of operation, the vehicle operates as a pure battery electric vehicle, but the long range and additional power of the ICE power train is available when needed. PHEVs are commonly called "grid-connected hybrids."

PHEVs require the user of a battery charging system to plug a vehicle charger into an AC outlet. But the wall outlets and circuits that provide 110V and 220V AC to a user of a battery charging system have various current rating and other operating parameters that affect the rate at which the battery can be charged. To charge the vehicle's battery it is desirable to draw the maximum continuous current at which the circuit is rated.

When a circuit distribution panel, wire and outlet are installed in a building, the outlet is selected so that its rating is compatible with the current rating of the wire and circuit distribution panel. Later if a connection is made between a PHEV charger and the outlet, without knowledge of the current rating of the outlet, the charger will be limited by code to draw the magnitude of current permitted in the lowest rated outlet, which is typically 15 A. This reduction in current draw will unnecessarily reduce the power draw from a higher current outlet and extend the length of the period required to charge the traction battery.

To overcome this difficulty, there is a need in the industry accurately and reliably to detect the current rating of the electrical power supply circuit, to communicate that current rating to the battery charger, and to adjust the charge rate such that the length of charge period is minimized.

SUMMARY OF THE INVENTION

A method for charging an electric storage battery in a plug-in electric vehicle through a power supply circuit includes coupling a charger to the circuit, providing the charger with a signal representing a current capacity of the circuit, using the signal to determine a maximum charge rate corresponds to the current capacity of the circuit represented by the signal, and charging the battery through the circuit and charger at the maximum charge rate.

A system for charging an electric storage battery in a plug-in electric includes a power supply circuit including wires and a first outlet electrically coupled to the wires, a signal source transmitting a signal, the signal representing a current capacity of the circuit, and a charger coupled to the circuit and the battery, in communication with the signal source, and configured to vary the time rate at which the battery is charged depending on the current capacity of the circuit represented by the signal.

The charge rate at which the battery is charged through the power supply circuit changes depending on the current capacity of the power supply circuit to which the charger is connected. In this way, the rated capacity of the circuit is not exceeded by recharging the battery.

The signal is transmitted on the current conducting wires of the circuit, on a dedicated wire not part of the power supply circuit or by RF communication. This system and method enable the user to recharge the battery at an optimal rate that does not exceed the current rating of the circuit.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
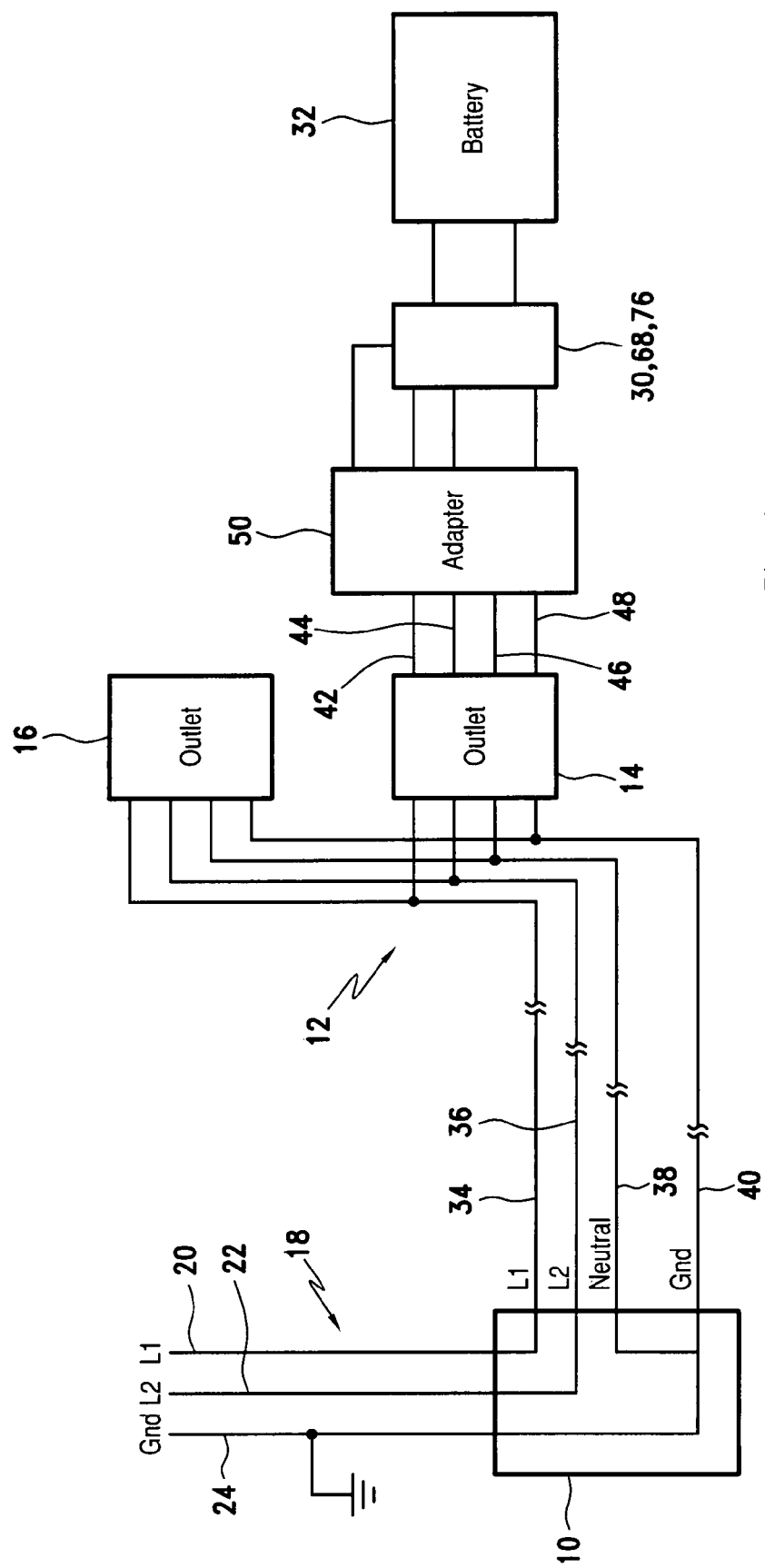
FIG. 1 is a schematic diagram of an electrical distribution circuit to which a battery charger can be connected.

Referring first to FIG. 1, AC electric power from an electric utility power grid is transmitted to a circuit distribution panel 10 located in a residential or commercial site having a supply circuit 12, which includes wall outlets or receptacles 14, 16. Electric power is supplied to the site through a line 18, which includes wire 20 on the L1 phase, wire 22 on the L2 phase, and ground wire 24. Electric power is supplied from circuit distribution panel 10 through circuit 12 and outlet 14 to a charger 30, which is used to charge an electric storage battery 32 of an electric vehicle, such as a PHEV.

Wire 42 is electrically coupled through electrical outlet 14, L1-wire 34 and circuit distribution panel 10 to L1-wire 20. Wire 44 is electrically coupled through outlet 14, L2-wire 36 and circuit distribution panel 10 to L2-wire 22. Wire 46 is electrically coupled through outlet 14, neutral wire 38 and circuit distribution panel 10 to wire 24. Wire 48 is electrically coupled through outlet 14, ground wire 40 and circuit distribution panel 10 to wire 24.

Figures 2, 3, 4:
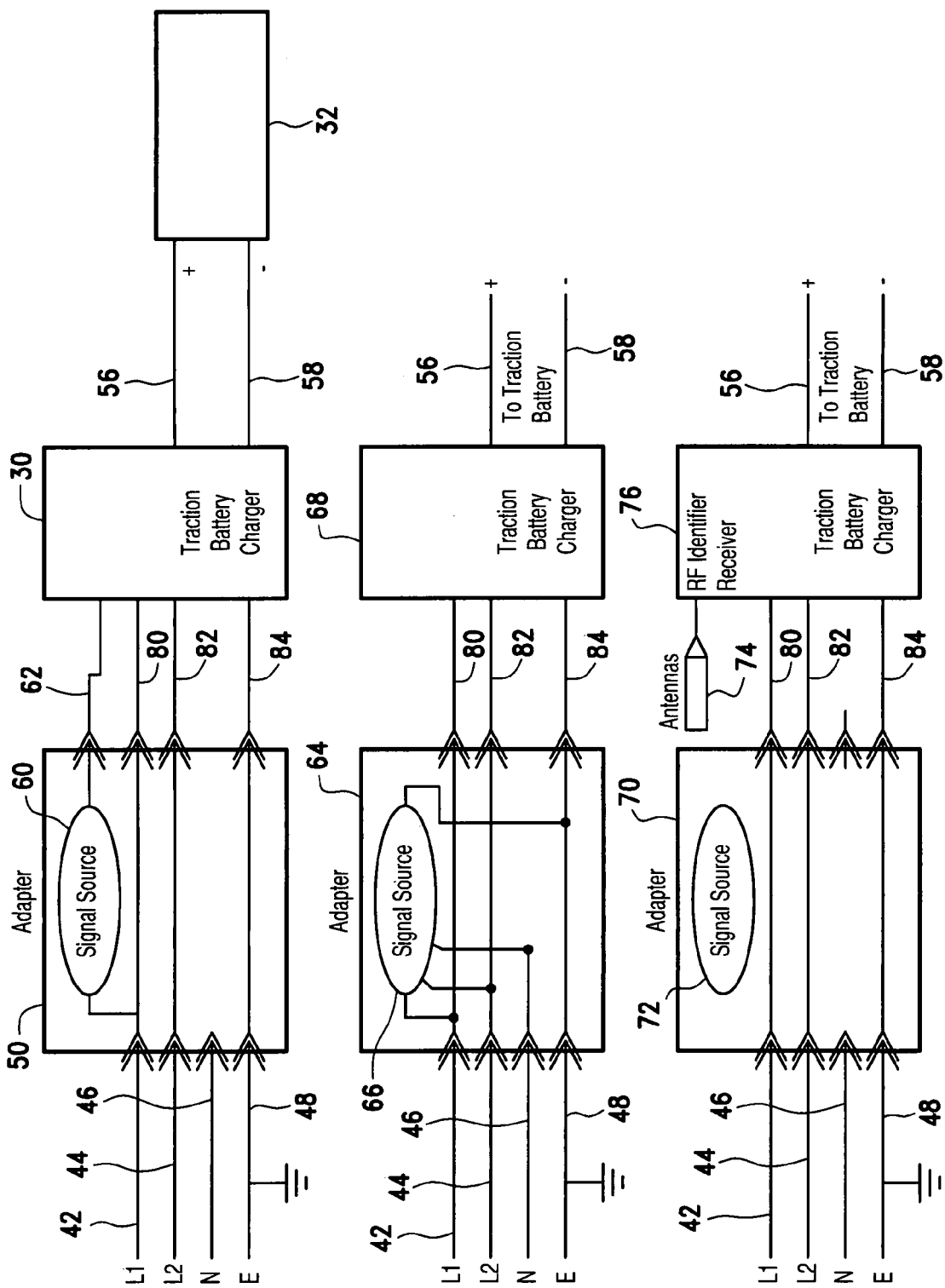
FIG. 2 is a schematic diagram illustrating a system for sensing and communicating through a dedicated line information regarding the capacity of a circuit to which a battery charger is coupled.
FIG. 3 is a schematic diagram illustrating a system for sensing and communicating through power lines information regarding the capacity of a circuit to which a battery charger is coupled.
FIG. 4 is a schematic diagram illustrating a system for sensing and wirelessly communicating information regarding the capacity of a circuit to which a battery charger is coupled.

The adapter for the power cord of charger 30 includes wires, which are coupled through outlet 14 to wires 34, 36, 38, 40, respectively, and to an adapter 50 of FIG. 1, or 64 of FIG. 3, or 70 of FIG. 4. Adapter 50 includes a signal source 60, preferably located in adapter 50, the signal source producing an output signal representing the current rating of circuit 12. Adapter 64 includes a signal source 66, preferably located in adapter 64, the signal source producing an output signal representing the current rating of circuit 12. Adapter 70 includes a signal source 72, preferably located in adapter 70, the signal source producing an output signal representing the current rating of circuit 12. Signal source 60 transmits its output signal on a dedicated wire 62 between adapter 50 and charger 30. Signal source 66 may transmit its output signal on any of wires 80, 82, 84 between adapter 64 and charger 68. Signal source 72 may transmit its output via a RF output signal between adapter 70 and antenna 74.

Referring now to FIGS. 2-4, each adapter 50, 64, 70 couples wires 42, 44, 46, 48 to a traction battery charger 30, 68, 76, respectively. Each charger 30, 68, 70 includes an electronic circuit for converting its AC input to DC output, which is carried on wires 56, 58 to the battery 32.

Adapter 50 includes a signal source 60, which transmits an output signal produced by signal source 60 and carried on line 62 to charger 30, the signal representing the current rating of circuit 12. Charger 30 responds to the current-rating signal by charging the battery 32 at a charge rate that is no greater than the current rating transmitted from the signal source 60.

FIG. 3 illustrates an alternate embodiment, in which adaptor 64 includes a signal source 66, which transmits a signal produced by signal source 66 on one or more of lines 80, 82, 84, the signal representing the current rating of circuit 12. In response to the output signal of signal source 66, the signal carried on one or more of lines 80, 82, 84 to charger 68 and representing the current rating of circuit 12, charger 68 charges battery 32 at a charge rate that is no greater than the current rating transmitted from the signal source 66.

FIG. 4 illustrates a third embodiment, in which adaptor 70 includes a signal source 72, such as a transponder, which transmits an RF signal representing the current rating of circuit 12 to an antenna 74, which communicates the current-rating signal to a charger 76. The charger 76 includes a receiver for receiving RF signals, and an identifier that identifies the RF signal representing the current capacity of the power supply circuit. Charger 76 is further configured to receive the identified RF signal and to vary the battery charge rate depending on the current capacity of the circuit represented by the identified RF signal. Charger 76 responds to the current-rating signal by charging the battery 32 at a charge rate that is no greater than the current rating transmitted from the signal source 72.

The method and system are applicable both to a plug-in hybrid electric vehicle having a primary power source and a secondary power source, and to a plug-in electric vehicle, in which no alternate power source other than an electric motor is used.

In accordance with the provisions of the patent statutes, the preferred embodiment has been described. However, it should be noted that the alternate embodiments can be practiced otherwise than as specifically illustrated and described.

What is claimed is:

1. A method for charging an electric storage battery in a plug-in hybrid electric vehicle through a power supply circuit, comprising the steps of:
   (a) coupling the charger to the circuit;
   (b) providing the charger with a signal representing a current capacity of the circuit;
   (c) using the signal to determine a maximum charge rate corresponding to the current capacity of the circuit represented by the signal; and
   (d) charging the battery through the circuit and charger at the maximum charge rate.

2. The method of claim 1, wherein the circuit includes wires carrying current to the charger, wherein step (b) further includes the step of transmitting the signal to the charger on a wire that carries current to the charger.

3. The method of claim 1, wherein step (b) further includes the step of:
   transmitting the signal from a signal source to the charger on a wire dedicated to transmitting the signal.

4. The method of claim 1, wherein step (b) further includes the steps of:
   transmitting wirelessly from a signal source to the charger the signal representing the current capacity of the circuit.

5. The method of claim 4, wherein the signal is transmitted by RF communication.

6. A system for charging an electric storage battery in a plug-in hybrid electric vehicle, comprising:
   a power supply circuit;
   a signal source transmitting a signal representing a current capacity of the power supply circuit; and
   a charger coupled to the power supply circuit and the battery, in communication with the signal source, and configured to charge the battery from the power supply circuit at a charge rate whose magnitude is represented by the signal.

7. The system of claim 6 wherein the system further comprises:
   an adapter coupled to the circuit through said wires, the adapter including the signal source; and
   a wire through which the signal is transmitted from the signal source to the charger.

8. The system of claim 6 wherein:
   the power supply circuit includes first and second current carrying wires and a return wire; and
   the system further comprises an adapter coupled to the power supply circuit and the charger through said wires, the adapter including the signal source, and the signal being transmitted from the signal source to the charger on one or more of the first and second current carrying wires and the return wire.

9. The system of claim 6 further comprising:
   an adapter coupled to the power supply circuit and the charger, the adapter including the signal source, which produces an RF signal; and
   the charger further including a receiver for receiving RF signals, and an identifier that identifies the RF signal representing a current capacity of the power supply circuit.

10. A system for charging an electric storage battery in a plug-in electric vehicle, comprising:
    a power supply circuit;
    a signal source transmitting a signal representing a current capacity of the power supply circuit; and
    a charger coupled to the power supply circuit and the battery, in communication with the signal source, and configured to vary a charge rate depending on the current capacity of the circuit represented by the signal, to determine with reference to the signal representing the current capacity of the circuit a maximum charge rate at which the battery is charged, and to charge the battery at the maximum charge rate.

11. The system of claim 10 wherein the system further comprises:
an adapter coupled to the circuit through wires, the adapter including the signal source; and
a wire through which the signal is transmitted from the signal source to the charger.

12. The system of claim 10 wherein:
the power supply circuit includes first and second current carrying wires and a return wire; and
the system further comprises an adapter coupled to the power supply circuit and the charger through said wires, the adapter including the signal source, and the signal being transmitted from the signal source to the charger on one or more of the first and second current carrying wires and the return wire.

13. The system of claim 10 further comprising:
an adapter coupled to the power supply circuit and the charger, the adapter including the signal source that produces an RF signal; and
the charger further including a receiver for receiving RF signals, and an identifier that identifies the RF signal representing a current capacity of the power supply circuit.

* * * * *